June 23, 1925.
H. NIELSEN
CHUCK
Filed Feb. 28, 1924
1,542,826
2 Sheets-Sheet 2
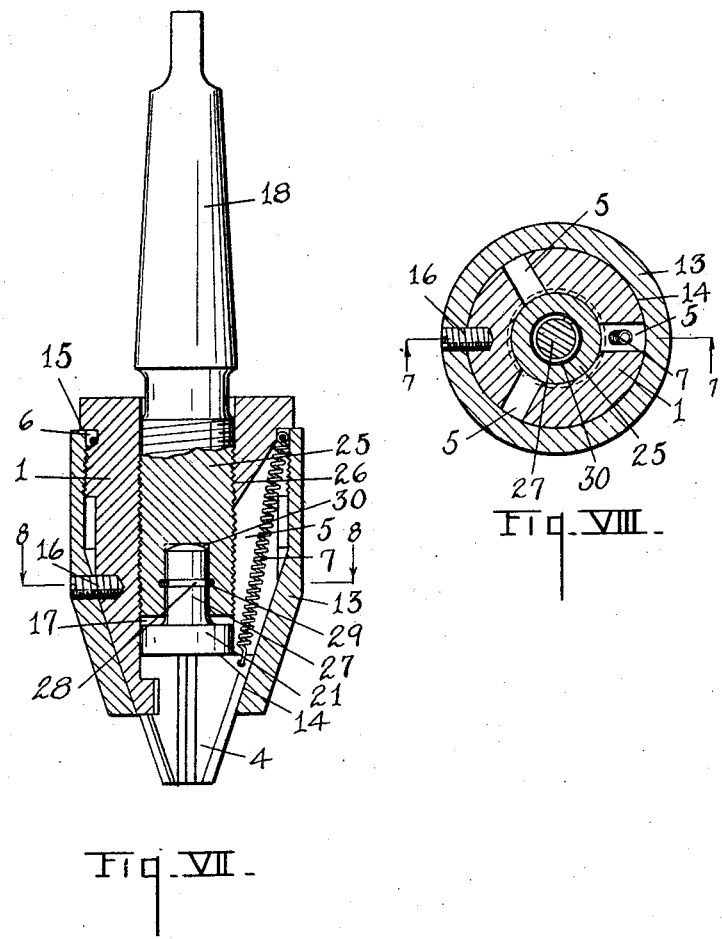
INVENTOR
Holger Nielsen
BY Chappell & Earl
ATTORNEYS Patented June 23, 1925.

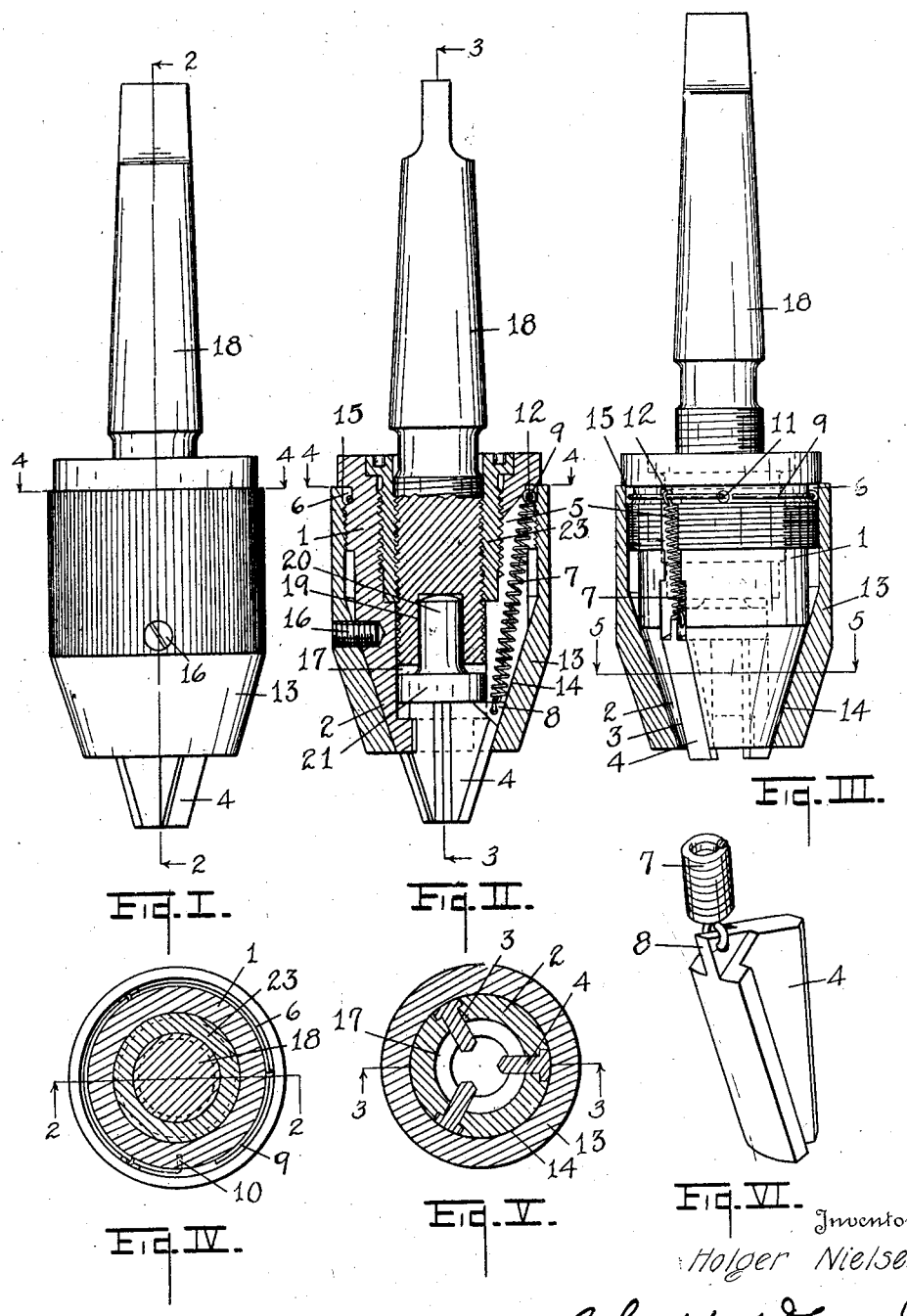

1,542,826

UNITED STATES PATENT OFFICE.

HOLGER NIELSEN, OF LAWTON, MICHIGAN, ASSIGNOR TO NIELSEN-BARTON CHUCK & TOOL COMPANY, OF LAWTON, MICHIGAN.

CHUCK.

Application filed February 23, 1924. Serial No. 695,710.

*To all whom it may concern:*

Be it known that I, HOLGER NIELSEN, a citizen of the United States, residing at Lawton, county of Van Buren, State of Michigan, have invented certain new and useful Improvements in Chucks, of which the following is a specification.

This invention relates to improvements in chucks.

The main object of this invention is to provide an improved chuck which is easily manipulated to loosen or tighten the jaws.

A further object is to provide an improved chuck in which the jaws are positively retracted when freed.

A still further object is to provide an improved chuck which is very simple and economical in its parts and at the same time one which is very strong and durable.

Objects pertaining to details and economies of construction and operation of my improvements will definitely appear from the detailed description to follow.

I accomplish the objects of my invention by the devices and means described in the following specification. The invention is clearly defined and pointed out in the claim.

A structure which is a preferred embodiment of my invention is clearly illustrated in the accompanying drawing forming a part of this application, in which:

Fig. I is a side view of my improved chuck.

Fig. II is a central longitudinal section on a line corresponding to line 2—2 of Figs. I and IV, parts being shown in full lines for convenience in illustration.

Fig. III is a side view with the shell in central vertical section corresponding to line 3—3 of Fig. II.

Fig. IV is a horizontal section on a line corresponding to line 4—4 of Figs. I and II.

Fig. V is a horizontal section on a line corresponding to line 5—5 of Fig. III.

Fig. VI is a perspective view of one of the jaws and a portion of its retracting spring.

Fig. VII is a longitudinal central section of a modified embodiment of my invention on a line corresponding to line 7—7 of Fig. VIII.

Fig. VIII is a horizontal section on a line corresponding to line 8—8 of Fig. VII.

In the drawing the sectional views are taken looking in the direction of the little arrows at the ends of the section lines and similar numerals of reference refer to similar parts throughout the several views.

Referring to the drawing, my improved chuck comprises a body member 1 having a tapered portion 2 at its lower end provided with longitudinal ways 3 for the jaws 4. Above these ways the body is provided with longitudinal slots 5 which open to the peripheral groove 6. The coiled springs 7 are connected to ears 8 formed on the jaws and their upper ends are engaged with the retaining ring 9 arranged in the groove 6. This ring is a split ring as indicated, and has a lug 10 at one end engaged in a hole 11 in the body, thereby preventing rotation of the ring, the main advantage of this, however, being in assembling as it permits the engagement of the ring and the slipping of the eyes 12 on the upper ends of the springs upon the ring. Then, by expanding the springs the jaws may be slipped into their ways.

The jaws are slidably supported in their ways by means of the shell 13 which has an internally tapered portion 14 at its lower end embracing the tapered portion of the body. This shell is threaded upon the body as illustrated against the shoulder 15 and is secured to the body by the screw 16 so that the body and shell rotate as one piece when assembled.

The body has a longitudinal bore 17 for the shank 18, the shank having a recess 19 in its lower end adapted to receive the stem 20 of the jaw thrust member 21. This thrust member engages the upper ends of the jaws so that when the body is rotated upon the shank or relative to the shank, the thrust member forces the jaws downwardly and retracting permits the springs to retract the jaws.

In the embodiment detailed in Fig. II the spindle is provided with a supporting sleeve 23 into which it is threaded, the sleeve in turn being threaded into the body.

In the embodiment shown in Figs. VII and VIII the spindle 25 is threaded directly into the body 26. These are merely structural differences, the operation of the chuck being the same. In this embodiment the stem 27 of the thrust member 21 has a groove 28 therein which is engaged by the retaining spring 29 seated within a complementary groove in the recess 30.

My improved chuck is operated to open or close the jaws by a turning of the body relative to the shank, as when the shank is secured to a driving spindle the body may be grasped, the shell portion thereof being shown as knurled to facilitate grasping. The parts are so formed that they can be very accurately and economically produced and assembled by unskilled labor and, at the same time, the chuck is very strong and durable.

Having thus described my invention what I claim as new and desire to secure by Letters Patent is:

A chuck comprising a body member tapered at its lower end and having longitudinal jaw ways in its tapered portion and slots extending therefrom and a peripheral groove opening to said slots, jaws arranged in said ways, springs disposed in said slots and connected to said jaws, a split ring with which said springs are connected disposed in said groove, said ring having a lug at one end engaging a hole in said body, and a shell threaded upon said body to embrace and support said jaws and enclose said springs and ring.

In witness whereof, I have hereunto set my hand.

HOLGER NIELSEN. [L. S.]